(12) United States Patent
Chava et al.

(10) Patent No.: US 12,062,371 B2
(45) Date of Patent: Aug. 13, 2024

(54) VOICE BASED INTERFACE FOR RESIDENTIAL GATEWAYS AND ACCESS POINT DEVICES

(71) Applicant: ARRIS Enterprises LLC, Suwanee, GA (US)

(72) Inventors: Sambashivarao Chava, Karnataka (IN); Chetan Kumar Viswanath Gubbi, Karnataka (IN); Yashaswini Ashok Kumar, Karnataka (IN); Gopal Pushpa Subramaniyam, Tamil Nadu (IN); Balaji Vinayagam, Chennai (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 387 days.

(21) Appl. No.: 17/404,179

(22) Filed: Aug. 17, 2021

(65) Prior Publication Data
US 2022/0093096 A1    Mar. 24, 2022

Related U.S. Application Data

(60) Provisional application No. 63/080,304, filed on Sep. 18, 2020.

(51) Int. Cl.
*G10L 15/22*    (2006.01)
*G06F 3/16*    (2006.01)
(Continued)

(52) U.S. Cl.
CPC ............. *G10L 15/22* (2013.01); *G10L 15/26* (2013.01); *H04L 67/10* (2013.01); *G10L 2015/221* (2013.01); *G10L 2015/223* (2013.01)

(58) Field of Classification Search
CPC ... G10L 15/22; G10L 15/26; G10L 2015/221; G10L 2015/223; G06F 1/1632;
(Continued)

(56) References Cited

U.S. PATENT DOCUMENTS

2015/0097689 A1*  4/2015  Logue ................. H04L 65/1069
                                                340/632
2020/0177517 A1   6/2020  Pancras et al.

FOREIGN PATENT DOCUMENTS

WO     2020/135355    7/2020

OTHER PUBLICATIONS

International Search Report and the written opinion of the International Searching Authority dated Nov. 25, 2021 in International (PCT) Application No. PCT/US2021/046233.
(Continued)

*Primary Examiner* — Leshui Zhang
(74) *Attorney, Agent, or Firm* — Wenderoth, Lind & Ponack, L.L.P.

(57) ABSTRACT

A client device attempts to communicate with an access point device both when it is connected to the wireless network along with the access point device as well as when the client device is remote communicating over the Internet. The client device determines a communications path and appropriate command protocol depending upon the client device's location and the communications command protocol supported by the access point device. Once this selection occurs, a user may provide a voice command which is translated into text and converted into an appropriate formatted command message for transmission to the access point device. Any response from the access point device is received by the client device as the same formatted command message which is converted to speech and presented to the user and both an audio and a visual display corresponding to the response.

20 Claims, 9 Drawing Sheets

(51) Int. Cl.
*G10L 15/26* (2006.01)
*H04L 41/082* (2022.01)
*H04L 67/10* (2022.01)

(58) Field of Classification Search
CPC . G06F 3/167; G06F 3/16; H04L 67/10; H04L 41/082; H04L 12/2803; H04L 63/101; H04L 63/0428; H04L 67/02; H04W 12/06; H04W 12/08; H04W 36/32; G06Q 30/04; H04M 1/271
USPC .... 704/270, 270.1, 271, 272–275, 500, 501, 704/503, 504; 381/315, 105; 455/3.01, 455/3.03, 3.05, 3.06; 700/94
See application file for complete search history.

(56) References Cited

OTHER PUBLICATIONS

International Preliminary Report on Patentability and Written Opinion issued Mar. 30, 2023 in International Application No. PCT/US2021/046233.

\* cited by examiner

VOICE BASED INTERFACE FOR RESIDENTIAL GATEWAYS AND ACCESS POINT DEVICES

TECHNICAL FIELD

The subject matter of the present disclosure relates generally to management and control of wireless devices in a wireless network.

BACKGROUND

There has been a rapid rise in the use of wireless devices in wireless networks, which has increased network traffic drastically, degraded the quality of service, and reduced the coverage capabilities of many network devices (e.g., gateways, access points, and wireless extenders). The wireless industry recognized these issues and developed standards for routing protocols such as a multi-access point (MAP) or mesh protocol, which allows wireless devices to communicate with each other using optimal paths for relaying data in the wireless network. The MAP or mesh protocol defines the control protocols and the data objects necessary to enable onboarding, provisioning, control, and management of wireless devices in a wireless network.

A wireless network implementing the MAP or mesh protocol (e.g., MAP or mesh network) generally includes the use of a MAP control device for the control and management of devices in the wireless network to improve the quality of experience (QoE) for users. Additionally, there have been advances in connecting a client device to an access point device on a wireless network. For example, client devices may connect to an access point device to review and configure the access point from both outside the wireless network through the Internet, and from within the wireless network with and without an Internet connection to the access point device. Each of these communication connections typically requires a specific communication and command protocol which may provide an advantage in different circumstances. Each of these communication connections also may require a user to provide different commands to perform similar operations. All of these different communications connections, communication and command protocols, and user command input requirements may make configuring an access point challenging.

Thus, it would be advantageous and an improvement over the relevant technology to provide network device configuration of an access point device in a wireless network using a plurality of connection mechanisms along their corresponding communication protocol based upon a single voice-based command user interface. The user would provide input instructions using simple voice commands where the client device selects an appropriate communication connection and communication and command protocol for use at a given time based upon the location of the client device, the available functionality of the access point device, and any other circumstances which determine a preferred communications mechanism at a particular point in time.

SUMMARY

An aspect of the present disclosure provides an access point device for a client device performing network device configuration of the access point device in a wireless network. The wireless network is configured to communicatively interconnect the access point device and one or more client devices. In this aspect of the present disclosure, the access point device includes a network controller, a non-transitory memory storing a program, and a communication interface configured to establish communication connections with the one or more client devices via the wireless network and configured to establish communication connections via the Internet to an access point cloud server.

The client device is configured to execute the program to receive a user voice command from the user of the client device, convert the user voice command to a user text command, determine whether or not a client device is connected to the wireless home network, transmit the user text command to a cloud server accessible via the Internet; and receive a text response message from the server.

In another aspect of the present disclosure, the client device is configured to determine when the client device is connected to the wireless home network, verify the user text command is a valid input, determine whether or not and when a local connection agent is present in the access point device connected to the wireless home network, translate the user text command onto a JSON command message, and send the formatted command message to the access point device.

In another aspect of the present disclosure, the client device is configured to determine when the client device is connected to the wireless home network, verify the user text command is a valid input, determine whether or not and when a local connection agent is present in the access point device connected to the wireless home network, translate the user text command onto a XML, command message, and send the formatted command message to the access point device.

In another aspect of the present disclosure, the client device is configured to determine when the client device is connected to the wireless home network, verify the user text command is a valid input, determine whether or not and when a local connection agent is present in the access point device connected to the wireless home network, translate the user text command onto a WebUI command message, and send the WebUI command message to the access point device.

In another aspect of the present disclosure, the client device is configured to receive a text response message from the access point device, convert a text response message to a speech response message, and provide an audio/visual response of the speech response message to the user of the client device.

An aspect of the present disclosure provides a method performing network device configuration of an access point device in a wireless network. The wireless network is configured to communicatively interconnect an access point device and one or more client devices. The method receives a user voice command from the user of the client device, converts the user voice command to a user text command, determines whether or not and when the client device is connected to the wireless home network, transmits the user text command to an access point cloud server accessible via the Internet, and receives a text response message from the access point cloud server.

The method also includes converting a text response message to a speech response message, and providing an audio/visual response of the speech response message to the user of the client device.

In another aspect of the present disclosure, the method performs the following operations when the client device is connected to the wireless home network: verifies that the user text command is a valid input, determines whether or not and when a local connection agent is present in the access point device connected to the wireless home network, translates the user text command into a JSON command message, sends the JSON command message to the access point device, and receives a JSON command response message from the access point device.

In another aspect of the present disclosure, the method performs the following operations when the client device is connected to the wireless home network: verifies that the user text command is a valid input, determines whether or not and when a local connection agent is present in the access point device connected to the wireless home network, translates the user text command into a XML, command message, sends the XML, command message to the access point device, and receives an XML command response message from the access point device.

In an aspect of the present disclosure, the method performs the following operations when the client device is connected to the wireless home network: verifies that the user text command is a valid input, determines whether or not and when a local connection agent is present in the access point device connected to the wireless home network, translates the user text command into a WebUI command message, sends the WebUI command message to the access point device, and receives a WebUI response message from the access point device.

An aspect of the present disclosure provides a non-transitory computer-readable recording medium in a client device for performing network device configuration of an access point device in a wireless network. The wireless network is configured to communicatively interconnect the access point device and one or more client devices and the non-transitory computer-readable recording medium stores one or more programs which, when executed by the client device, performs steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
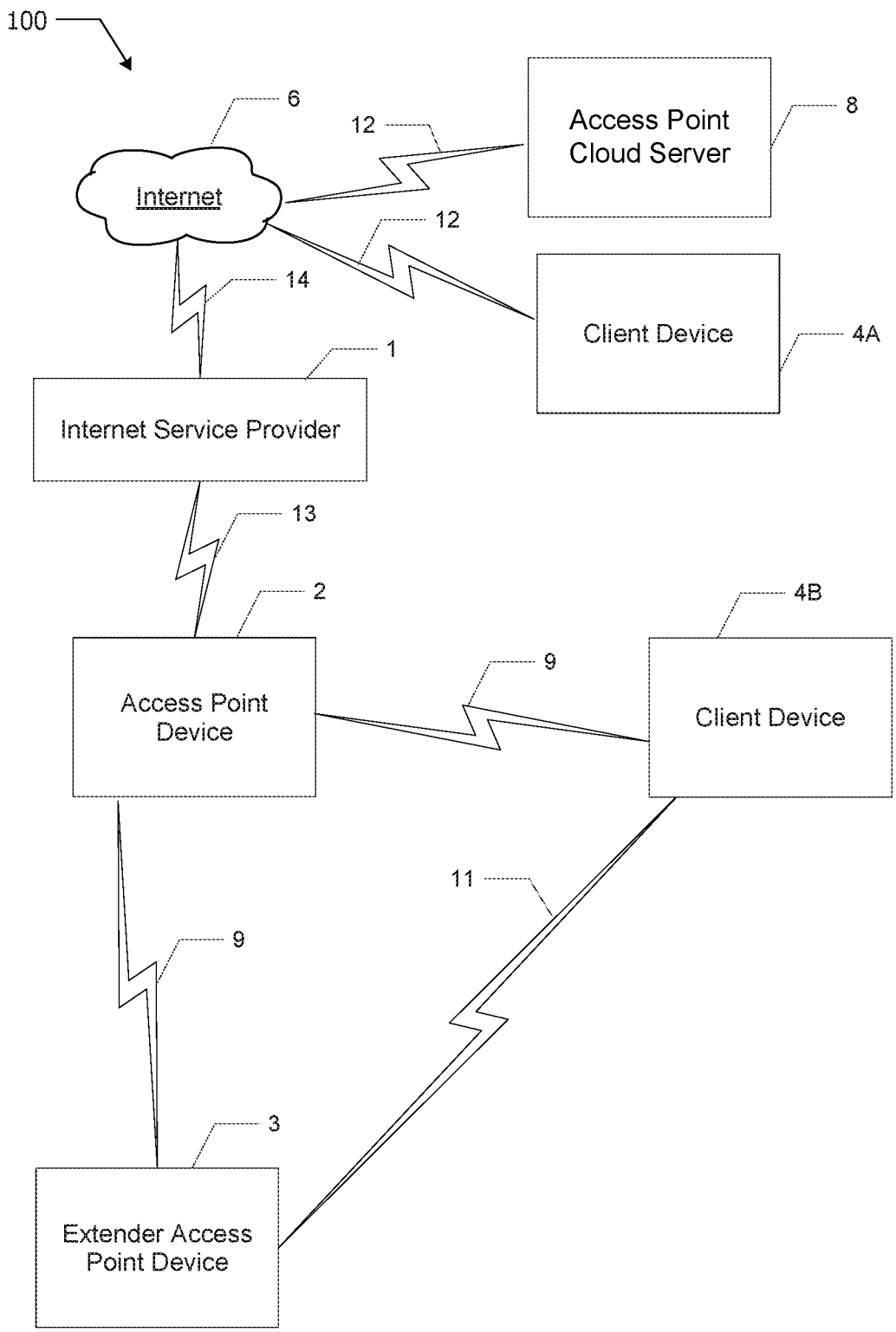
FIG. 1 is a schematic diagram of a system according to an embodiment of the present disclosure.

FIG. 1 is a schematic diagram of a system according to an embodiment of the present disclosure.

As shown in FIG. 1, the main elements of the system include an access point device 2 connected to the Internet 6 via an Internet Service Provider (ISP) 1 and also connected to different wireless devices such as wireless extender access point devices 3 and client devices 4B. Client device 4A, which is connected directly to the Internet 6, (e.g., via mobile broadband infrastructure such as for 4G or 5g) is identical to the client device 4B found on the wireless network. The main point here is that the client device 4A is connected to the internet in some way other than through the access point device 2. The system shown in FIG. 1 includes wireless devices (e.g., wireless extender access point devices 3 and client devices 4B) that may be connected in one or more wireless networks (e.g., private, guest, iControl, backhaul network, or Internet of Things (IoT) network) within the system. Additionally, there could be some overlap between wireless devices (e.g., wireless extender access point devices 3 and client devices 4) in the different networks. That is, one or more network devices could be located in more than one network. For example, the wireless extender access point devices 3 could be located both in a private network for providing content and information to a client device 4B and also included in a backhaul network or an iControl network.

Starting from the top of FIG. 1, the ISP 1 can be, for example, a streaming video provider or any computer and other associated equipment for connecting the access point device 2 to the Internet 6. The connection 14 between the Internet 6 and the ISP 1 and the connection 13 between the ISP 1 and the access point device 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line, a public switched data network (PSDN), a global Telex network, or a 2G, 3G, 4G or 5G network, for example.

The connection 13 can further include as some portion thereof a broadband network connection, an optical network connection, or other similar connections. For example, the connection 13 can also be implemented using a fixed wireless connection that operates in accordance with, but is not limited to, 3rd Generation Partnership Project (3GPP), Long Term Evolution (LTE) or 5G protocols.

The access point device 2 can be, for example, a hardware electronic device that may be a combination modem and access point device that combines the functions of a modem, an access point, and/or a router for providing content received from the content provider 1 to network devices (e.g., wireless extender access point devices 3 and client devices 4B) in the system. It is also contemplated by the present disclosure that the access point device 2 can include the function of, but is not limited to, an Internet Protocol/Quadrature Amplitude Modulator (IP/QAM), set-top box (STB) or smart media device (SMD) that is capable of decoding audio/video content and playing over-the-top (OTT)- or multiple system operator (MSO)-provided content.

The connection 9 between the access point device 2, the wireless extender access point device 3, and client devices 4B can be implemented using a wireless connection in accordance with any IEEE 802.11 Wi-Fi protocols, Bluetooth protocols, Bluetooth Low Energy (BLE) protocols, or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 9 can be implemented using a wireless connection that operates in accordance with, but is not limited to, RF4CE, ZigBee, Z-Wave, or IEEE 802.15.4 protocols. It is also contemplated by the present disclosure that the connection 9 can include connections to a media over coax (MoCA) network. One or more of the connections 9 can also be a wired Ethernet connection.

The wireless extender access point device 3 can be, for example, hardware electronic devices such as access points used to extend the wireless network by receiving the signals transmitted by the access point device 2 and rebroadcasting the signals to, for example, client devices 4, which may be out of range of the access point device 2. The wireless extender access point device 3 can also receive signals from the client devices 4B and rebroadcast the signals to the access point device 2, or other client devices 4B.

The connections 11 between the wireless extender access point device 3 and the client devices 4 are implemented through a wireless connection that operates in accordance with any IEEE 802.11 Wi-Fi protocols, Bluetooth protocols, Bluetooth Low Energy (BLE) protocols, or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 11 can be implemented using a wireless connection that operates in accordance with, but is not limited to, RF4CE, ZigBee, Z-Wave, or IEEE 802.15.4 protocols. Also, one or more of the connections 11 can be a wired Ethernet connection.

The client devices 4B can be, for example, hand-held computing devices, personal computers, electronic tablets, smart phones, smart speakers, IoT devices, iControl devices, portable music players with smart capabilities capable of connecting to the Internet, cellular networks, and can interconnect with other devices via Wi-Fi and Bluetooth, or other wireless hand-held consumer electronic devices capable of executing and displaying content received through the access point device 2. Additionally, the client devices 4B can be a TV, an IP/QAM STB or an SMD that is capable of decoding audio/video content and playing over OTT- or MSO-provided content received through the access point device 2.

The connection 11 between the access point device 2 and the client device 4 is implemented through a wireless connection that operates in accordance with, but is not limited to, any IEEE 802.11 protocols. Additionally, the connection 11 between the access point device 2 and the client device 4B can be implemented through a WAN, a LAN, a VPN, MANs, PANs, WLANs, SANs, a DOCSIS network, a fiber optics network (e.g., FTTH, FTTX, or HFC), a PSDN, a global Telex network, or 2G, 3G, 4G or 5G networks, for example.

The connection 11 also can be implemented using a wireless connection in accordance with Bluetooth protocols, Bluetooth Low Energy (BLE) protocols, or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 11 can also be a wired Ethernet connection.

Client device 4A may communicate with access point 2 using its connection to the Internet 6 and using an access point cloud server 8 that is accessible over the Internet 6. Client device 4A connects to the access point device 2 in order to view the current status of the access point device 2 as well as configure the access point device 2 as needed. An access point cloud server 8 provides communication with the access point device 2 when the client device 4A is not attached to the wireless network. The access point cloud server 8 may be provided as a service by an IPS 1 or by a third party such as an access point device manufacturer, in order for users to easily access their access point devices 2 wherever they are located.

When the client device 4A is connected to the Internet 6, the client device 4B communicates with the access point cloud server 8 via the internet. When the client device 4B is connected to the wireless network along with the access point device 2, the client device 4B may communicate directly to the access point device 2. The communications between the client device 4B and the access point device 2 may occur over the wireless network regardless of a status of a connection 13 to the ISP 1 and its connection 14 to the Internet 6.

In order to make a user's of the client device 4A-4B interaction with the access point device 2 easier, the client device 4A-4B accepts voice-based input commands that are processed into corresponding device commands that are ultimately sent to the access point device 2. The client device 4A-4B initially decides whether it is attached to the wireless network along with the access point device 2. Based upon its location, the client device 4A-4B decides the communications path to be used and an appropriate command and communications protocol to be used. Once these selections are made, the client device 4A-4B translates the voice command to the appropriate command protocol and initiates communications with the access point device 2. A communications session may continue between the client device 4A-4B and the access point device 2 until the user is satisfied that the communications session is over.

The client device 4A-4B may communicate with more than one access point device 2 depending upon the networks to be viewed and controlled. Each communications session with a particular access point device 2 follows the same process disclosed above.

Figure 2:
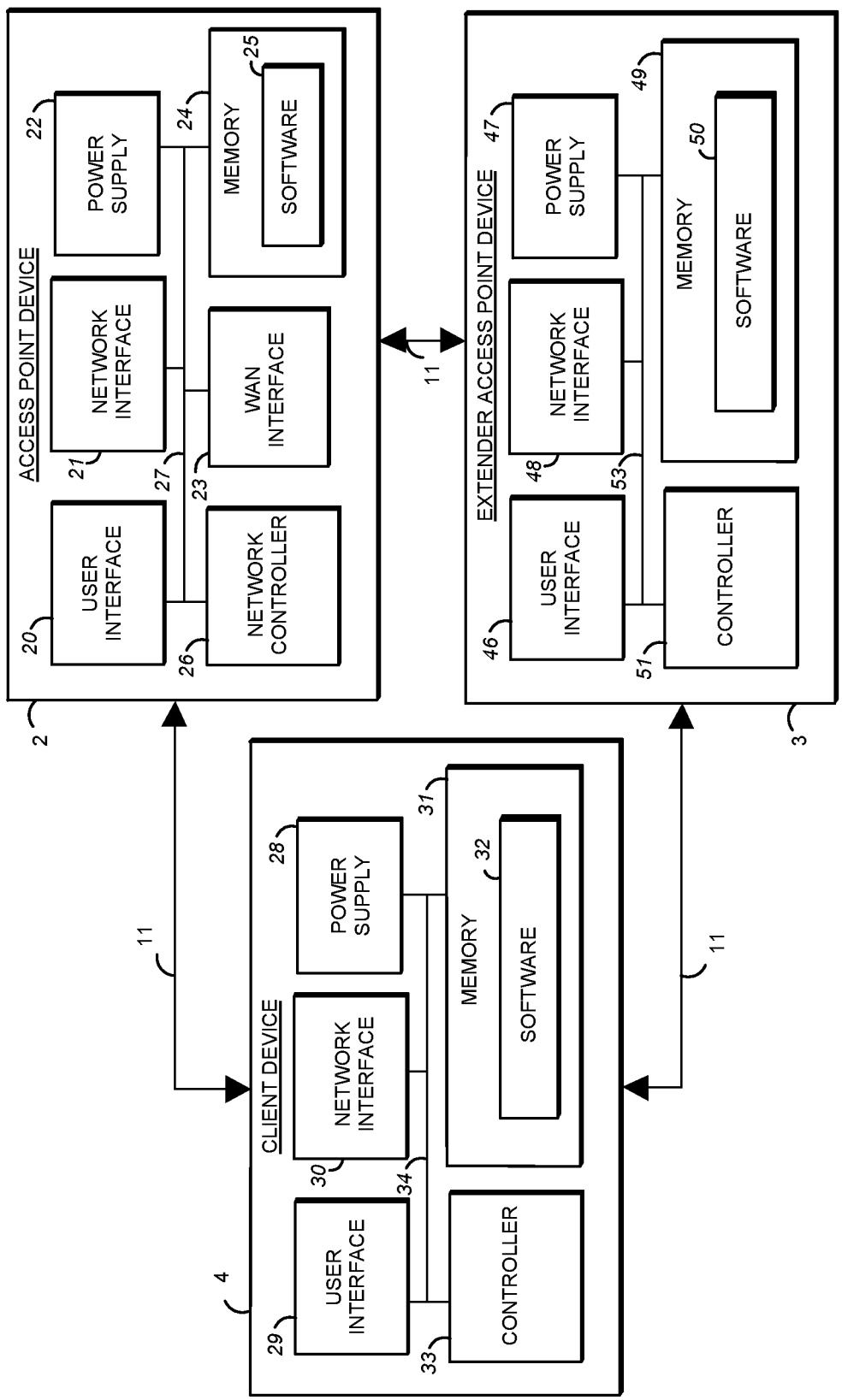
FIG. 2 is a more detailed schematic diagram of an exemplary access point device, client device, and wireless extender access point device implemented in the system of FIG. 1 according to an embodiment of the present disclosure.

A detailed description of the exemplary internal components of the access point device 2, the wireless extender access point device 3, and the client devices 4 shown in FIG. 1 will be provided in the discussion of FIG. 2. However, in general, it is contemplated by the present disclosure that the access point device 2, the wireless extender access point devices 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the access point device 2, the wireless extender access point devices 3, and the client devices 4 may be adapted to execute any operating system, including Linux, UNIX, Windows, MacOS, DOS, and Chrome OS, as well as virtual machines adapted to virtualize execution of a particular operating system, including customized and proprietary operating systems. The access point device 2, the wireless extender access point devices 3, and the client devices 4 are further equipped with components to facilitate communications with other computing devices over the one or more network connections to local and wide area networks, wireless and wired networks, public and private networks, and any other communications network enabling communications in the system.

It should be noted that while the embodiments discussed herein are directed to an access point device, the access point device may also include functionality of both a modem and a router and may thus be considered a gateway device. The present invention is not intended to limit the type of access point devices considered to be part of the invention because of the use of these embodiments to describe the invention. The present invention should only be limited by limitations recited within the attached claims.

FIG. 2 is a more detailed schematic diagram of an exemplary access point device 2, an exemplary wireless extender access point devices 3, and an exemplary client device 4 implemented in the system of FIG. 1 according to an embodiment of the present disclosure. Although FIG. 2 only shows one wireless extender access point device 3 and one client device 4, the wireless extender access point device 3 and the client device 4 shown in the figure are meant to be representative of the other wireless extender access point devices 3 and client devices 4A-4B shown in FIG. 1. Similarly, the connections 9 between the access point device 2, the wireless extender access point device 3, and the client device 4 shown in FIG. 2 are meant to be exemplary connections and are not meant to indicate all possible connections between the access point devices 2, wireless extender access point devices 3, and client devices. Additionally, it is contemplated by the present disclosure that the number of access point devices 2, wireless extender access point devices 3, and client devices 4 is not limited to the number of access point devices 2, wireless extender access point devices 3, and client devices 4 shown in FIGS. 1 and 2.

Now referring to FIG. 2 (e.g., from left to right), the client device 4 can be, for example, a computer, a portable device, an electronic tablet, an e-reader, a PDA, a smart phone, a smart speaker, an IoT device, an iControl device, a portable music player with smart capabilities capable of connecting to the Internet, or cellular networks and interconnect with other devices via Wi-Fi and Bluetooth, or other wireless hand-held consumer electronic devices capable of executing and displaying the content received through the access point device 2. Additionally, the client device 4 can be a TV, an IP/QAM STB, or an SMD that is capable of decoding audio/video content and playing over OTT- or MSO-provided content received through the access point device 2.

As shown in FIG. 2, the client device 4 includes a power supply 28, user interface 29, network interface 30, a memory 31, and a controller 33. The power supply 28 provides power to the internal components of the client device 4 through the internal bus 34. The power supply 28 can be a self-contained power source such as a battery pack with an interface to be powered through an electrical charger connected to an outlet (e.g., either directly or by way of another device). The power supply 28 also can include a rechargeable battery that can be detached allowing for replacement, such as nickel-cadmium (NiCd), nickel metal hydride (NiMH), lithium-ion (Li-ion) or lithium polymer (Li-pol) batteries.

The user interface 29 includes, but is not limited to, push buttons, a keyboard, a keypad, a liquid crystal display (LCD), a cathode ray tube (CRT), a thin film transistor (TFT), a light-emitting diode (LED), a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the access point device 2 and the wireless extender access point device 3 using the wireless protocols in accordance with connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software or algorithms for controlling the general function and operations of the client device 4 in accordance with the embodiments described in the present disclosure (e.g., including the optimized onboarding according to the embodiments of the present disclosure).

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the client device 4 in accordance with the embodiments described in the present disclosure. Communications between the components (e.g., 28-31 and 33) of the client device 4 may be established using an internal bus 34.

The wireless extender access point device 3 can be, for example, a hardware electronic device such as an access point used to extend a wireless network by receiving the signals transmitted by the access point device 2 and rebroadcasting the signals to client devices 4, which may be out of range of the access point device 2. The wireless extender access point device 3 also can receive signals from the client devices 4 and rebroadcast the signals to the access point device 2, or other client devices 4.

As shown in FIG. 2, the wireless extender access point device 3 includes a user interface 46, a power supply 47, a network interface 48, a memory 49, and a controller 51. The user interface 46 can include, but is not limited to, push buttons, a keyboard, a keypad, an LCD, a TFT, an LED, an HD or other similar display device including a display device having touch screen capabilities so as to allow interaction between a user and the wireless extender access point device 3. The power supply 47 supplies power to the internal components of the wireless extender access point device 3 through the internal bus 53. The power supply 47 can include a self-contained power source such as a battery pack with an interface to be powered through an electrical charger connected to an outlet (e.g., either directly or by way of another device). The power supply 47 also can include a rechargeable battery that can be detached allowing for replacement, such as a NiCd, NiMH, Li-ion or Li-pol batteries.

The network interface 48 can include various network cards, interfaces, and circuitry implemented in software and/or hardware to enable communications with the client device 4 and the access point device 2 using the wireless protocols in accordance with connection 9 (e.g., as described with reference to FIG. 1). The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy.

The memory 49 can be used to store any type of instructions, software or algorithm including software 50 associated with controlling the general functions and operations of the wireless extender access point device 3 in accordance with the embodiments described in the present disclosure (e.g., including optimized onboarding according to the embodiments of the present disclosure).

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender access point device 3 in accordance with the embodiments described in the present disclosure. General communications between the components (e.g., 46-49 and 51) of the wireless extender access point device 3 may be established using the internal bus 53.

The access point device 2 can be, for example, a hardware electronic device that can combine the functions of a modem, an access point, and/or a router for providing content received from the content provider 1 to network devices (e.g., wireless extender access point devices 3, client devices 4, and mobile device 5) in the system. It is also contemplated by the present disclosure that the access point device 2 can include the function of, but is not limited to, an IP/QAM STB or SMD that is capable of decoding audio/video content, and playing OTT- or MSO-provided content.

As shown in FIG. 2, the access point device 2 includes a user interface 20, a network interface 21, a power supply 22, a WAN interface 23, a memory 24, and a network controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the access point device 2. The network interface 21 may include various network cards, and circuitry implemented in software and/or hardware to enable communications with the wireless extender access point device 3 and client device 4 using the wireless protocols in accordance with connection 9 (e.g., as described with reference to FIG. 1).

The power supply 22 supplies power to the internal components of the access point device 2 through the internal bus 27. The power supply 22 can be a self-contained power source such as a battery pack with an interface to be powered through an electrical charger connected to an outlet (e.g., either directly or by way of another device). The power supply 22 also can include a rechargeable battery that can be detached allowing for replacement such as a NiCd, a NiMH, a Li-ion, or a Li-pol battery. The WAN interface 23 may include various network cards, and circuitry implemented in software and/or hardware to enable communications between the access point device 2 and the ISP 1 using the wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software or algorithm including software 25 for controlling the general functions and operations of the access point device 2 and performing management functions related to the other devices (wireless extender access point devices 3 and client device 4) in the network in accordance with the embodiments described in the present disclosure (e.g., including optimized onboarding of device according to the embodiments of the present disclosure).

The network controller 26 controls the general operations of the access point device 2 as well as performs management functions related to the other devices (wireless extender access point devices 3 and client device 4) in the network. The network controller can include, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the access point device 2 in accordance with the embodiments described in the present disclosure. Communications between the components (e.g., 20-23, 24, and 26) of the access point device 2 may be established using the internal bus 27.

Figure 3:
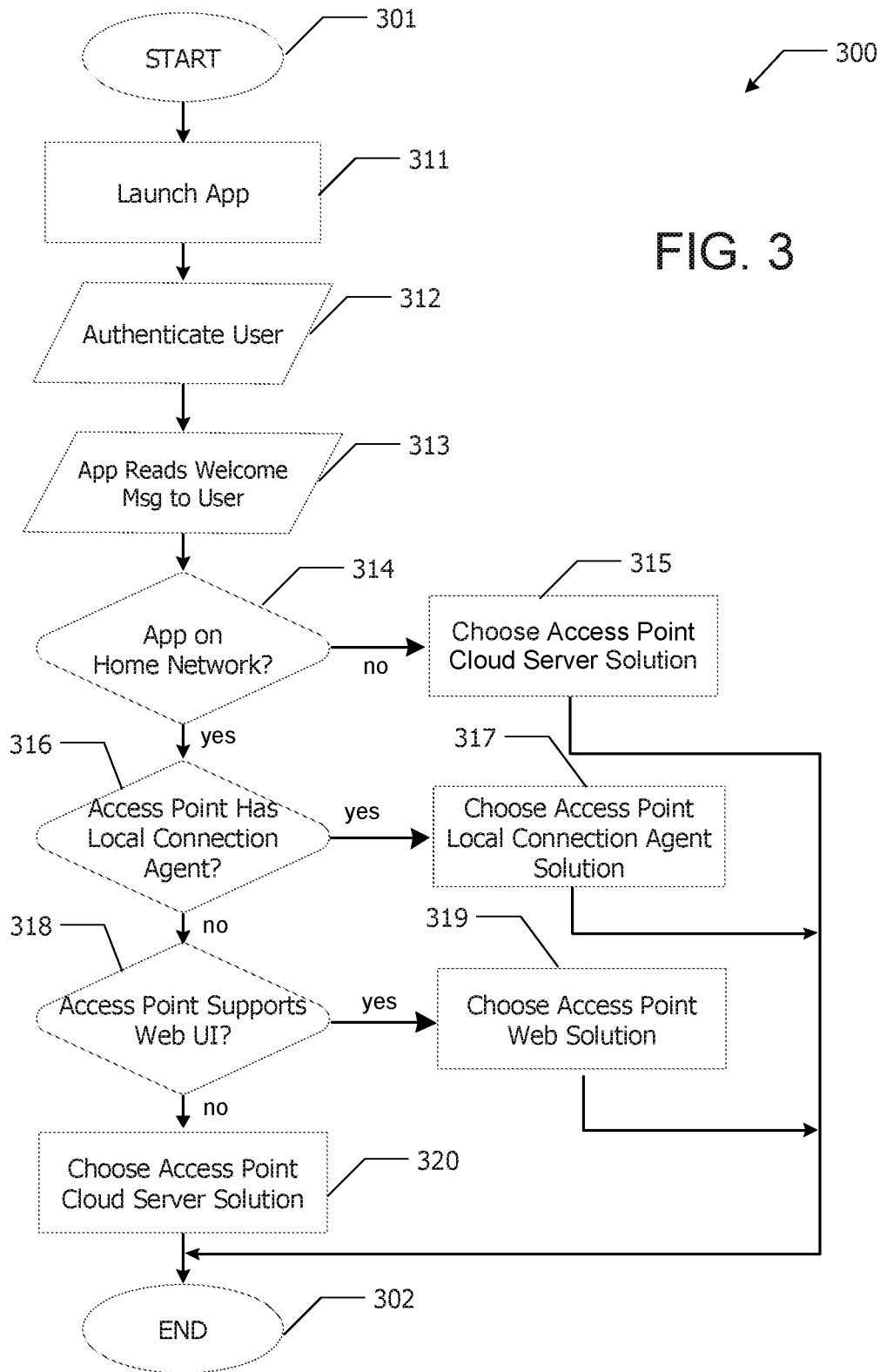
FIG. 3 illustrates a method and algorithm for performing network device configuration of an access point device in a wireless network according to an embodiment of the present disclosure.

FIG. 3 illustrates a method and algorithm for performing network device configuration of an access point device in a wireless network according to an embodiment of the present disclosure. The exemplary method and algorithm of FIG. 3 illustrate the actions taken by the client device 4 (e.g., as controlled by the controller 33 executing instructions stored on the memory 31) when deciding which communications path and corresponding command protocol is to be used by the client device 4 to communicate with the access point device 2. The process 300 starts 301 when a user of the client device 4 launches the mobile application in step 311. The user of the client device 4 is authenticated in step 312 to confirm his or her identity in order to determine what actions the user may take with respect to the access point device 2.

In step 313 the client device 4 reads a welcome message to the user of the client device 4 as part of the voice-based interface. In test step 314 the controller 33 determines whether or not the client device 4 is located on the wireless network along with the access point device 2; and if not, in step 315 the controller 33 selects the access point cloud server solution to communicate with the access point device 2 before the selection process ends 302.

When test step 314 results in a determination that the client device 4 is not located on the wireless network with the access point device 2, the controller 33, in test step 316, determines whether the access point device 2 possesses a local connection agent to assist client devices with communicating with the access point device; and when the local connection agent is present, in step 317 the controller 33 chooses an access point local connection agent solution before the selection process ends 302.

When test step 316 results in a determination that the local connection agent is not present, the controller 33, in test step 318, determines whether the access point device 2 supports a web-based user interface (WebUI) for client devices to communicate with the access point device; and when the WebUI is supported, and, in step 319, chooses an access point web-based solution before the selection process ends 302. When test step 318 results in a determination that the access point device 2 does not support the web-based solution, the controller 33, in step 320, chooses the access point cloud server solution as a default solution when no other local solution is available.

When the process 300 of FIG. 3 ends 302, the client device 4 continues to attempt to communicate with the access point device 4 using the communication solution selected above. Each of these three solutions are disclosed in reference to FIGS. 4-9 herein.

In FIGS. 4-9, it is assumed that the client device 4, the access point device 2, and the Wi-Fi extender access point device 3 include their respective software 25, 32, 50 stored in their respective memories 24, 31, 49, which when executed by their respective controllers 26, 33, 51 perform the functions and operations in accordance with the embodiments described in the present disclosure (e.g., including optimized onboarding of a device according to the embodiments of the present disclosure).

Figure 4:
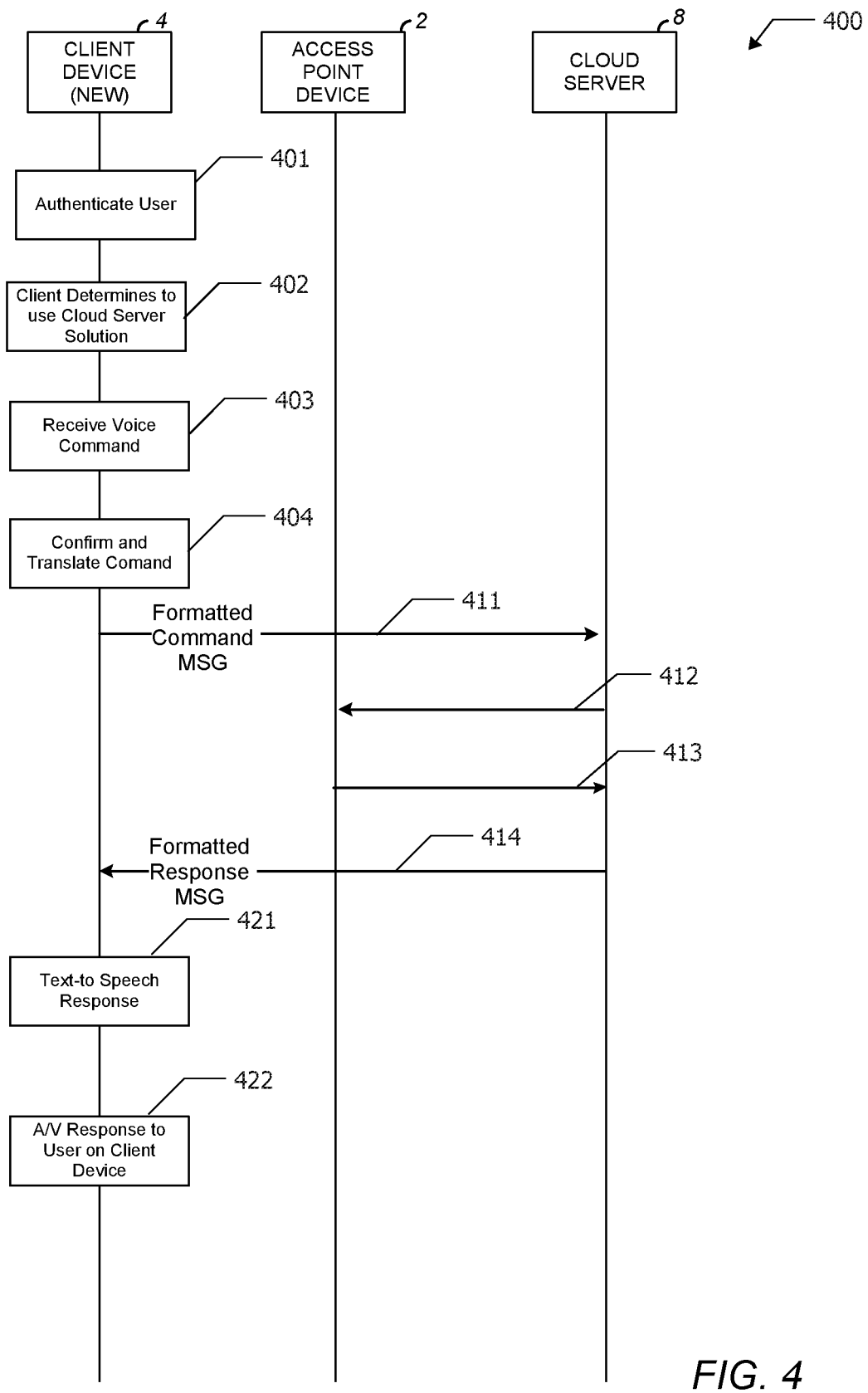
FIG. 4 illustrates a method and algorithm for performing network device configuration of an access point device in a wireless network according to an embodiment of the present disclosure.
Figure 6:
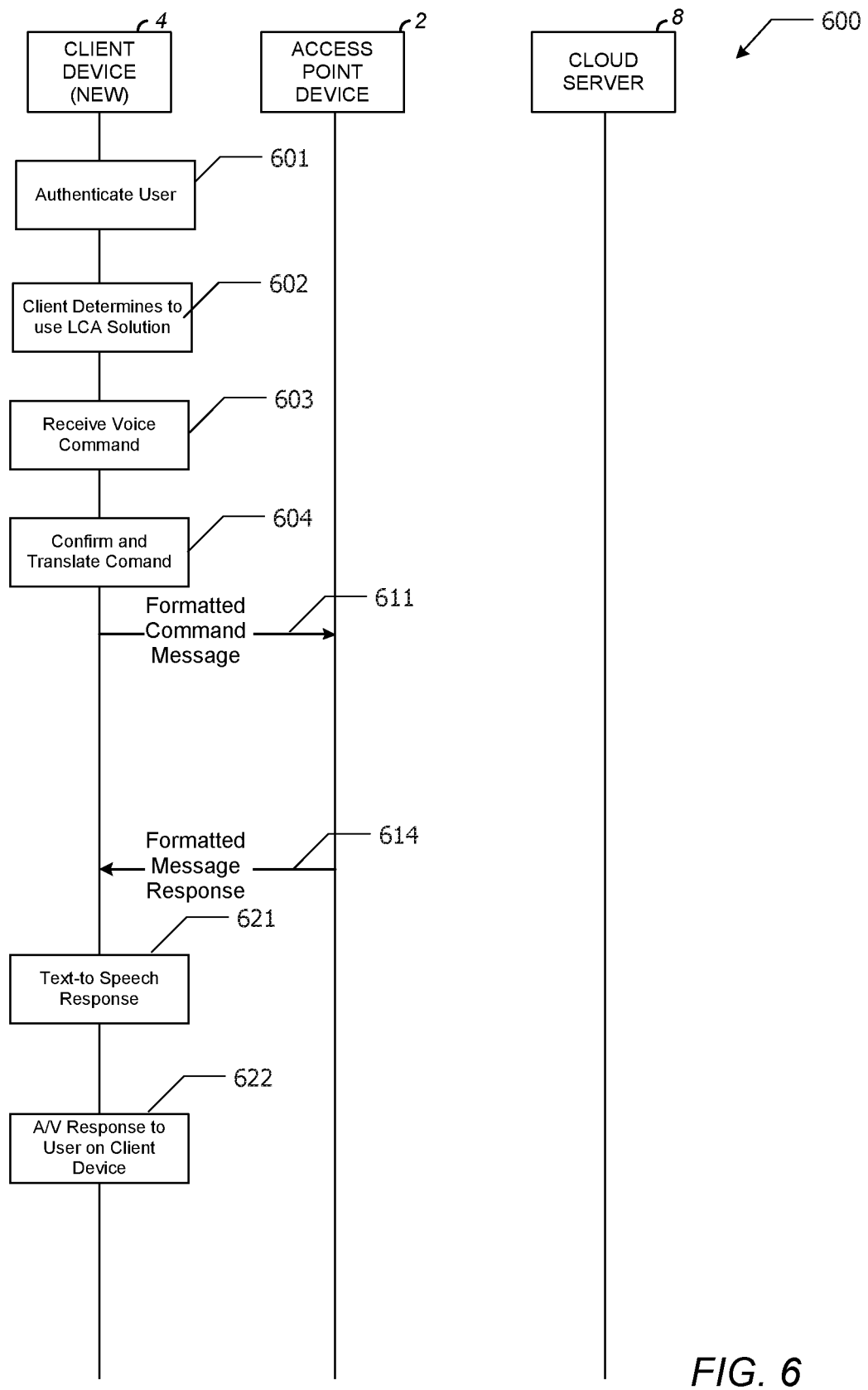
FIG. 6 illustrates a method and algorithm for performing network device configuration of an access point device in a wireless network according to an embodiment of the present disclosure.
Figure 8:
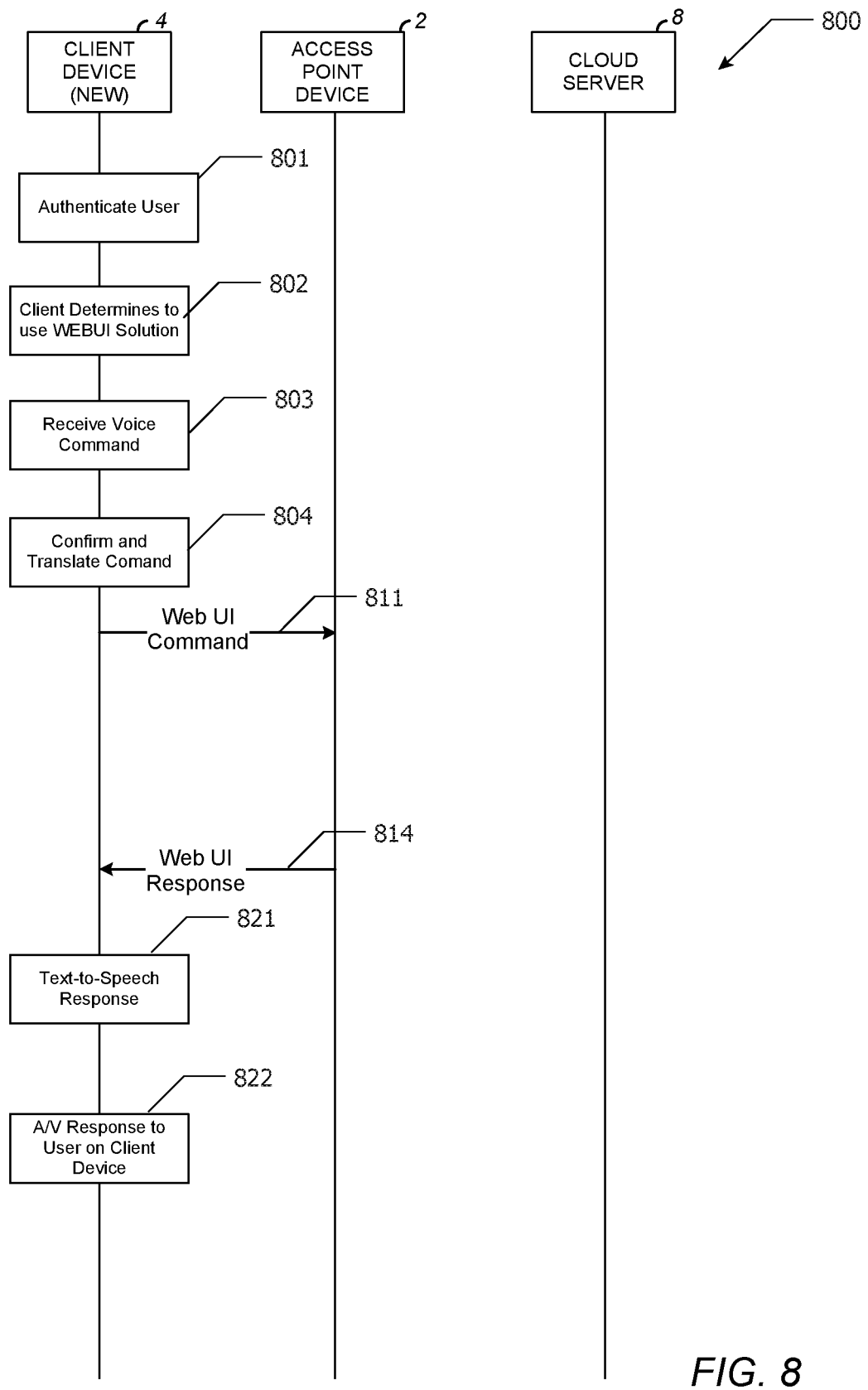
FIG. 8 illustrates a method and algorithm for performing network device configuration of an access point device in a wireless network according to an embodiment of the present disclosure.

Although FIGS. 4, 6, and 8 show one access point device 2, one client device 4 (e.g., new client device), the access point cloud server 8 that is connected to the Internet 6 and used when the client device 4 is not located on the wireless network, and no wireless extender access point devices 3, it is contemplated by the present disclosure that the method and algorithm can be applied to any number of access point devices 2, client devices 4, and wireless extender access point devices 3 for providing optimized onboarding of devices to any number of wireless networks in the system of FIG. 1.

FIG. 4 illustrates a method and algorithm for performing network device configuration of an access point device in a wireless network according to an embodiment of the present disclosure. In FIG. 4, the client device 4 begins the process 400 when a user is authenticated in step 401. In step 402, the controller 33 determines that the client device 4 is using the access point cloud server solution as disclosed above in reference to FIG. 3. A user provides a voice command to the client device 4 in step 403 providing the client device 4 with a requested action to be taken with regards to the access point device 2. The client device 4 converts the voice command to a command protocol message in step 404 and determines whether the voice command provided by the user is recognized and authorized based upon the user's prior authentication.

In the preferred embodiment, the speech to text conversion is performed locally within the client device 4. For client devices 4, whether a mobile device such as a smartphone or a computing system such as a laptop or desktop computer, the speech to text conversion may be a supported function provided by an operating system. In other embodiments, the speech to text translation may be provided by a web-based service such as Alexa™ from Amazon™ and Siri™ from Apple™. Additionally, the speech to text translation may be directed within a mobile application within the client device.

The determination of whether the voice command may be performed is first based upon whether the received voice command represents a valid command used to communicate with the access point device 2. The client device 4 may receive voice data that does not contain a recognized command and will not take any action unless the command is recognized as an instruction associated with the access point device 2. If the client device 4 recognizes the voice command as a supported action, the client device 4 determines whether the authenticated user is entitled to perform the requested operation. For example, a restricted user may be permitted to communicate with the access point device 2 to receive some or all of the status data associated with the operating state of this particular access point device 2, but may not be entitled to change any of the operating settings for the access point device 2. In this situation, the client device 4 determines whether the voice command received is requesting status data or attempting to update the access point device 2 before deciding whether to carry out the voice command. When the authenticated user is a privileged user who may both obtain status data and update the device settings, the client device 4 may reach a different decision for the same voice command. While this example illustrates just two different sets of user privileges, many different types of users and privileges may be used as needed.

Once the client device 4 determines that the command is valid, a formatted command is sent to the access point cloud server 8. The client device 4 typically communicates with the access point cloud server 8 using a Customer Premises Equipment (CPE) Wan Management protocol, such as TR-069 CWMP, to enable remote and safe configuration of network devices over the Internet 6.

Upon receipt of the formatted message from the client device 4, the access point cloud server 8 determines an address for the access point device and sends the user command to the access point device 2 in step 412. Typically, the client device 2 may identify the access point device 2 using a unique name that is associated with this particular user. For example, the user may have named the access point device 2 "Fell Street Gateway" in which this name has some meaning to the user. The user typically has an account with the access point cloud server 8 and the server 8 may look up the user's account to translate the user's name for the access point device 2 to a unique identifier, such as a serial number and a model number. The access point cloud server 8 checks to determine whether this access point device 2 is known and active, and if so, obtains an IP address for the access point device 2 that permits the access point cloud server 8 to communicate directly with the access point device 2.

It is assumed that if the access point device 2 is active and available for communications with the access point cloud server 8 that the access point device 2 has contacted the access point server 8 to inform the server of the access point device's IP address. For many residential gateways, the IP address of the device may be dynamically assigned by the ISP 1 and thus the access point server 8 needs to be periodically informed of the status and address of the access point device 2 in order for the server 8 and the access point device 2 to communicate. Because the IP addresses assigned by an ISP 1 do not change at a significant rate, the periodic updates of the information may be required when the access point device 2 first obtains its IP address and any time the access point device 2 obtains a new IP address. The access point device 2 may also periodically contact the access point cloud server 8 to inform the server that the access point device 2 is still active. The access point device 2 also may inform the access point cloud server 8 when it is shutting down.

When the access point cloud server 8 sends the command to the access point device 2 in step 412, the access point device 2 typically responds with a response generated to attempt to satisfy the command. The response, which is sent in step 413, may include access point device 2 status data when the command is a request to obtain the data. The response may also include an indication of a success or failure to change a setting when appropriate.

The access point cloud server 8 processes the response from the access point and sends a formatted response message in step 414. The client device 4, in step 421, processes the formatted response message into an audio/visual response that may be provided to the user. Audio/visual response herein means audio and/or video. In step 421 the client device 4 converts the message from text to speech using a translation process that is the reverse of the speech to text used to provide the voice commands. The speech data may be played to the user by the client device 4 as audio data in step 422. Additionally, text messages and other visual data also may be displayed to the user on the client device 4. This process 400 may be repeated for additional voice commands as desired.

Figure 5:
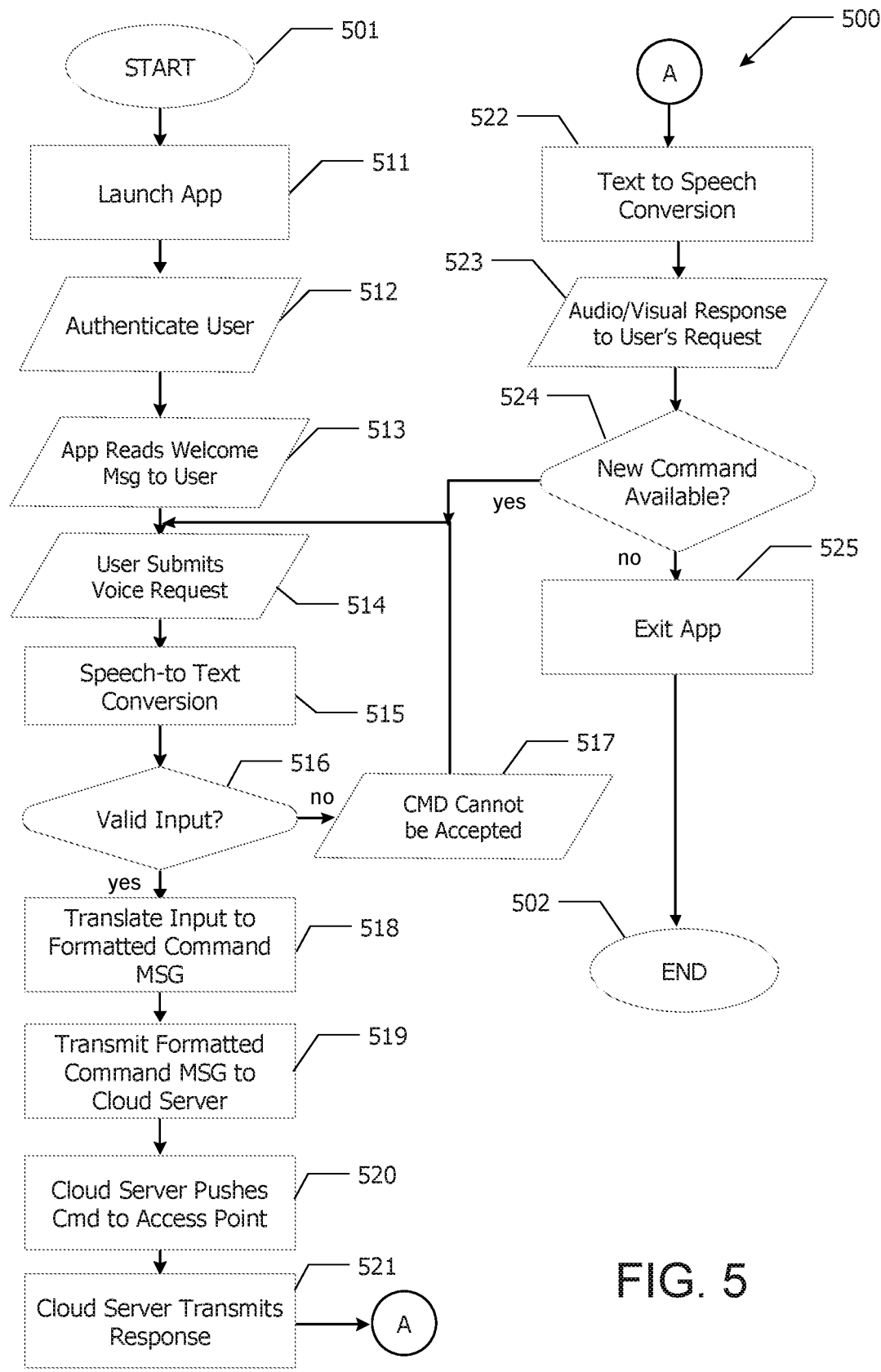
FIG. 5 illustrates a method and algorithm for performing network device configuration of an access point device in a wireless network according to an embodiment of the present disclosure.

FIG. 5 illustrates a method and algorithm for performing network device configuration of an access point device in a wireless network according to an embodiment of the present disclosure. The exemplary method and algorithm of FIG. 5 illustrate the action taken by the client device 4 when it attempts to communicate with the access point device 2 while the client device 4 is directly connected to the Internet 6.

In FIG. 5, the client device 4 begins the process 500 when a user launches the mobile application in step 511 and is authenticated in step 512. A welcome message may be read to the user in step 513 as part of the voice-based user interface. The user provides a voice command to the client device 4 in step 514 providing the client device 4 with a requested action to be taken with regards to the access point device 2. The client device 4 converts the voice command to a command protocol message in step 515 and, in test step 516, determines whether the voice command provided by the user is recognized and authorized based upon the user's prior authentication. When the command cannot be accepted, a message is sent to the user in step 517 and the process 500 returns to step 514 to receive another voice command.

When, in test step 516, the client device determines that the command may be accepted, in step 518 it translates the input command to a formatted command message such as the TR-069 as disclosed above in reference to FIG. 4. The formatted command message is transmitted to the access point cloud server 8 in step 518. The server 8 processes the command and pushes the requested command to the access point device 2 in step 520. The access point cloud server 8 sends a response message to the client device 4 in step 521 indicating the result of the command being processed.

The client device 4 converts the response from text to speech in step 522 and presents an audio and visual representation of the response in step 523. In test step 524 the client device 4 determines whether additional voice commands are to be received and processed, and if so, the process 500 returns to step 514 and the processing repeats as disclosed above. When the client device 4 in test step 524 determines that no additional voice commands are to be received, the application exits in step 525 and the process ends 502.

FIG. 6 illustrates a method and algorithm for performing network device configuration of an access point device in a wireless network according to an embodiment of the present disclosure. In FIG. 6, the client device 4 begins the process 600 when a user is authenticated in step 601. In step 602 the client device 4 determines that the client device 4 is using the local connection agent solution as disclosed above in reference to FIG. 3. A user provides a voice command to the client device 4 in step 603 providing the client device 4 with a requested action to be taken with regards to the access point device 2. The client device 4 converts the voice command to a command protocol message in step 604 and determines whether he voice command provided by the user is recognized and authorized based upon the user's prior authentication.

In the preferred embodiment, the speech to text conversion is performed locally within the client device 4 as disclosed above with reference to FIG. 4. The determination of whether the voice command may be performed is also determined in a similar manner as disclosed above with reference to FIG. 4.

Once the client device 4 determines that the command is valid, a formatted command message is sent to the access point 2 directly. The access point cloud server 8 is not involved in the solution recited in FIG. 6. The client device 4 typically communicates with the access point 4 using the formatted command messages. In one embodiment, the formatted command messages may be specified using a JavaScript Object Notation (JSON)-based command message. In another embodiment, the formatted command messages may be specified using an Extensible Markup Language (XML)-based command message. Other versions of formatted command messages also may be used.

Upon receipt of the formatted message from the client device 4, the access point device 2 typically responds with a response generated to attempt to satisfy the command. The response, which is sent in step 611, may include access point device 2 status data when the command is a request to obtain the data. The response also may include an indication of success or failure to change a setting when appropriate.

The access point device 2 sends a formatted response message in step 614. The client device 4, in step 621, processes the formatted response message into an audio/visual response that may be provided to the user. In step 621, the client device 4 converts the message from text to speech using a translation process that is the reverse of the speech to text used to provide the voice commands. The speech data may be played to the user as audio data in step 622. Additionally, text messages and other visual data may be displayed to the user on the client device 4. This process 600 may be repeated for additional voice commands as desired.

Figure 7:
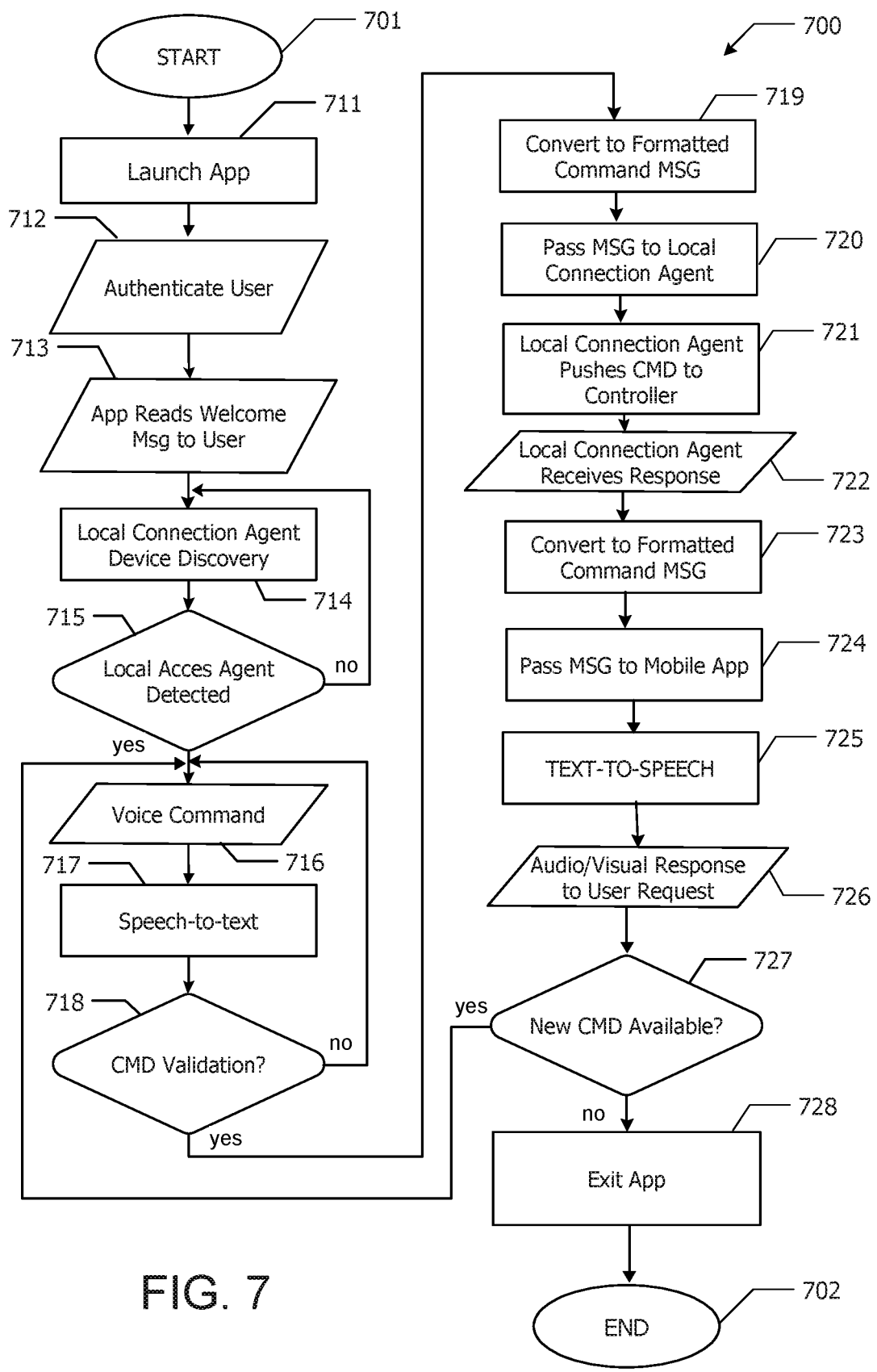
FIG. 7 illustrates a method and algorithm for performing network device configuration of an access point device in a wireless network according to an embodiment of the present disclosure.

FIG. 7 illustrates a method and algorithm for performing network device configuration of an access point device in a wireless network according to an embodiment of the present disclosure. The exemplary method and algorithm of FIG. 7 illustrate the action taken by the client device 4 when it attempts to communicate with the access point device 2 while the client device 4 is connected to the wireless network and a local connection agent is present in the access point device 2.

In FIG. 7, the client device 4 begins the process 700 when a user launches the mobile application in step 711 and is authenticated in step 712. The client device may read a welcome message to the user in step 713 as part of the voice-based user interface. In step 714 the client device 4 performs a local connection agent discovery query in which the client device determines whether or not a local connection agent is present. When the client device in test step 715 determines that the local connection agent is not present, the process 700 returns to step 714 to keep searching; otherwise, the process 700 accepts a voice command to the client device 4 in step 716 providing the client device 4 with a requested action to be taken with regards to the access point device 2. The client device 4 converts the voice command to a command protocol message in step 717 and, in test step 718, determines whether or not the voice command provided by the user is recognized and authorized based upon the user's prior authentication. When the command cannot be accepted, the process 700 returns to step 716 to receive another voice command.

When the client device 4 in test step 718 determines that the command may be accepted, in step 719 it translates the input command to a formatted command message such as JSON or XML as disclosed above in reference to FIG. 6. The formatted command message is transmitted to the local connection agent in the access point device 2 in step 720. The local connection agent pushes the requested command to the access point device 2 in step 721.

The client device 2 receives a response from the local connection agent in step 722. This response is formatted into JSON or XML in step 723 and the local connection agent sends a response message to the client device 4 in step 724 indicating the result of the command being processed.

The client device 4 converts the response from text to speech in step 725 and presents an audio and visual representation of the response in step 726. In test step 727 the client device 4 determines whether additional voice commands are to be received and processed, and if so, the process 700 returns to step 716 and the processing repeats as disclosed above. When in test step 727 the client device 4 determines that no additional voice commands are to be received, the application exits in step 728 and the process ends 702.

FIG. 8 illustrates a method and algorithm for performing network device configuration of an access point device in a wireless network according to an embodiment of the present disclosure. In FIG. 8, the client device 4 begins the process 800 when a user is authenticated in step 801. In step 802 the client device 4 determines that the client device 4 is using the local connection agent solution as disclosed above in reference to FIG. 3. A user provides a voice command to the client device 4 in step 803 providing the client device 4 with a requested action to be taken with regards to the access point device 2. The client device 4 converts the voice command to a command protocol message in step 804 and determines whether the voice command provided by the user is recognized and authorized based upon the user's prior authentication.

In the preferred embodiment, the speech to text conversion is performed locally within the client device 4 as disclosed above with reference to FIG. 4. The determination of whether the voice command may be performed is also determined in a similar manner as disclosed above with reference to FIG. 4.

Once the client device 4 determines that the command is valid, a WebUI command is sent to the access point 2 directly. The access point cloud server 8 is not involved in the solution recited in FIG. 8. The client device 4 typically communicates with the access point 4 using the WebUI formatted messages. For example, the client device 4 may send a GET message using the WebUI commands to obtain status data from the access point device 2. The client device 4 may also change a setting within the access point device 2 using a SET message. This communication path uses a web browser-based process contained within many access point devices.

Upon receipt of the formatted message from the client device 4, the access point device 2 typically responds with a response generated to attempt to satisfy the command. The response, which is sent in step 811, may include access point device 2 status data when the command is a request to obtain the data. The response may also include an indication of success or failure to change a setting when appropriate.

The access point device 2 sends this formatted response message in step 814. The client device 4, in step 821, processes the formatted response message into an audio/visual response that may be provided to the user by converting the message from text to speech using a translation process that is the reverse of the speech to text used to provide the voice commands. The speech data may be played to the user as audio data in step 822. Additionally, text messages and other visual data also may be displayed to the user on the client device 4. This process 800 may be repeated for additional voice commands as desired.

Figure 9:
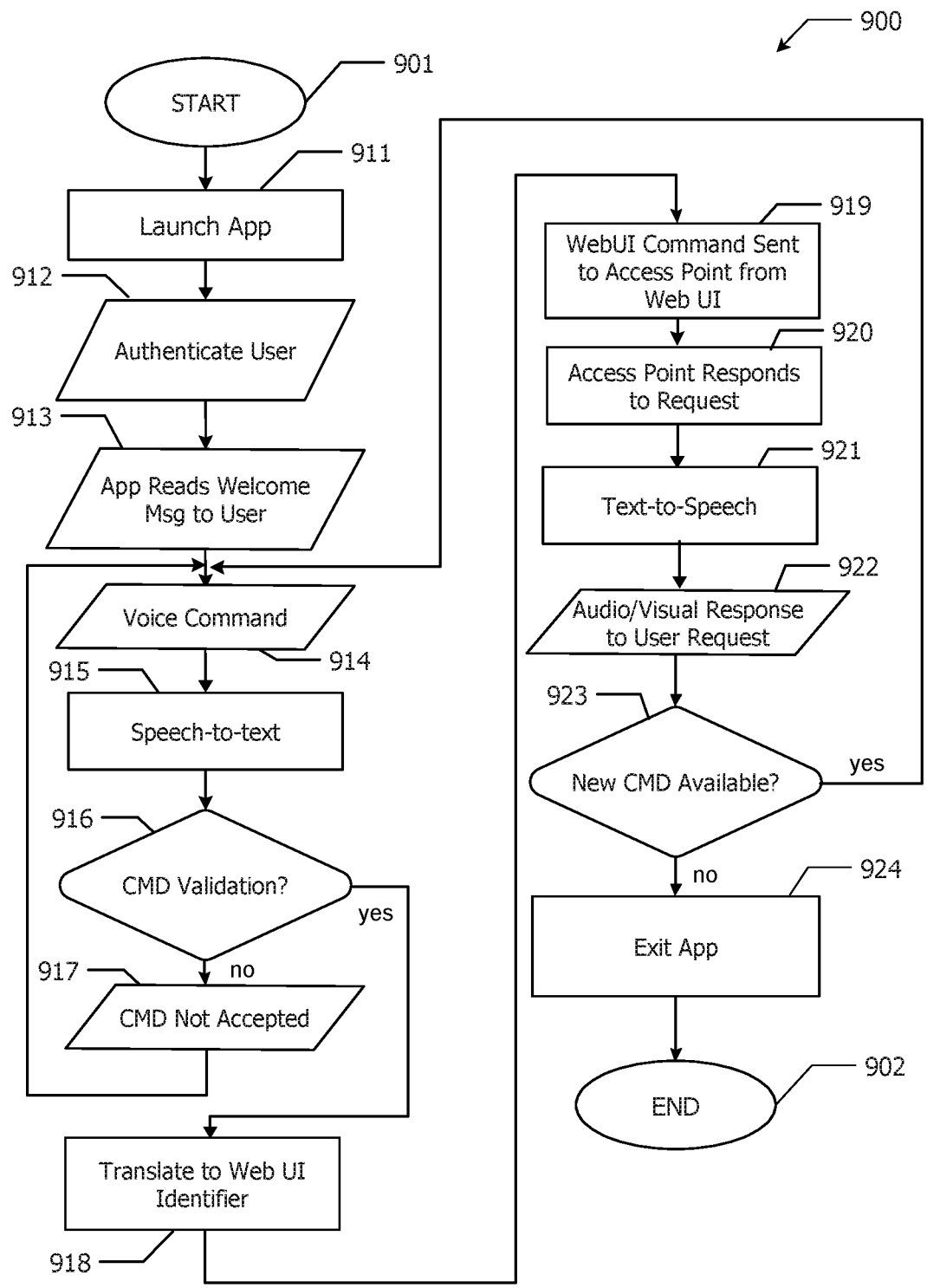
FIG. 9 illustrates a method and algorithm for performing network device configuration of an access point device in a wireless network according to an embodiment of the present disclosure.

FIG. 9 illustrates a method and algorithm for performing network device configuration of an access point device in a wireless network according to an embodiment of the present disclosure. The exemplary method and algorithm of FIG. 9 illustrate the action taken by the client device 4 when it attempts to communicate with the access point device 2 while the client device 4 is connected to the wireless network and a local connection agent is not present in the access point device 2.

In FIG. 9, the client device 4 begins 901 the process 900 when a user launches the mobile application in step 911 and is authenticated in step 912. A welcome message may be read by the client device 4 to the user in step 913 as part of the voice-based user interface. In step 914 the client device 4 accepts a voice command with a requested action to be taken with regards to the access point device 2. The client device 4 converts the voice command to a command protocol message in step 915 and, in test step 916, determines whether the voice command provided by the user is recognized and authorized based upon the user's prior authentication. When the command cannot be accepted, the process 900 provides an indication of the command failure in step 917 and returns to step 914 to receive another voice command.

When the client device 4 in test step 916 determines that the command may be accepted, in step 918 it translates the input command to a WebUI command message as disclosed above in reference to FIG. 8. The formatted command message is transmitted to the access point device 2 in step 919. The client device 2 receives a response from the access point device 2 in step 920 indicating the result of the command being processed.

The client device 4 converts the response from text to speech in step 921 and presents an audio/visual representation of the response in step 922. In test step 923 the client device 4 determines whether additional voice commands are to be received and processed, and if so, the process 900 returns to step 914 and the processing repeats as disclosed above. When in test step 923 the client device 4 determines that no additional voice commands are to be received, the application exits in step 924 and the process ends 902.

The present disclosure may be implemented as any combination of an apparatus, a system, an integrated circuit, and a computer program on a non-transitory computer readable recording medium. The one or more processors may be implemented as an integrated circuit (IC), an application specific integrated circuit (ASIC), large scale integrated circuit (LSI), system LSI, super LSI, or ultra LSI components that perform a part or all of the functions described in the present disclosure.

The present disclosure includes the use of software, applications, computer programs or algorithms. The software, applications, computer programs or algorithms can be stored on a non-transitory computer-readable medium for causing a computer, such as the one or more processors, to execute the steps described in FIGS. 3 and 4. For example, the one or more memories store software or algorithms with executable instructions and the one or more processors can execute a set of instructions of the software or algorithms in association with providing monitoring and installation enhancements in any number of wireless networks in accordance with the embodiments described in the present disclosure.

The software and computer programs, which can also be referred to as programs, software applications, applications, components or code include machine instructions for a programmable processor and can be implemented in a high-level procedural language, an object-oriented programming language, a functional programming language, a logical programming language, an assembly language or machine language. The term computer-readable recording medium refers to any computer program product, apparatus or device, such as a magnetic disk, optical disk, solid-state storage device, memory, and programmable logic devices (PLDs) used to provide machine instructions or data to a programmable data processor including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices or any other medium that can be used to carry or store desired computer-readable program code in the form of instructions or data structures and that can be accessed by a general-purpose or special-purpose computer or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. A client device for configuration of an access point device in a wireless home network, the wireless home network configured to communicatively interconnect the access point device and one or more client devices to the Internet, the client device comprising:
   a memory having instructions stored thereon; and
   a processor configured to execute the instructions on the memory to cause the client device to:
      receive a user voice command from the user of the client device;
      convert the user voice command to a user text command;
      determine whether the client device is connected to the wireless home network;
      in a case in which the client device has determined that the client device is not connected to the wireless home network, perform the following operations:
         transmit the user text command to a cloud server via the Internet; and
         receive a text response message from the cloud server;
      in a case in which the client device has determined that the client device is connected to the wireless home network, perform the following operations:
         transmit the user text command to the access point device; and
         receive a text response message from the access point device;
      convert the text response message to a speech response message; and
      provide an audio response of the speech response message to the user of the client device.

2. The client device according to claim 1, wherein the processor is further configured to execute the instructions on the memory to cause the client device to:
   verify the user text command is a valid input;
   determine whether a local connection agent is present in the access point device connected to the wireless home network;
   in a case in which the client device has determined that the local connection agent is present in the access point device connected to the wireless home network, perform the following operations:
      translate the user text command onto a formatted command message; and
      send the formatted command message to the access point device.

3. The client device according to claim 2, wherein the formatted command message is a JavaScript Object Notation (JSON)-based command message.

4. The client device according to claim 2, wherein the formatted command message is an Extensible Markup Language (XML)-based command message.

5. The client device according to claim 1, wherein the processor is further configured to execute the instructions on the memory to cause the client device to:
verify the user text command is a valid input;
determine whether a local connection agent is present in the access point device connected to the wireless home network;
in a case in which the client device has determined that the local connection agent is not present in the access control device connected to the wireless home network, perform the following operations:
translate the user text command onto a web UI command message; and
send the web UI command message to the access point device.

6. The client device according to claim 1, wherein the client device converts the speech to text using a cloud based translation server.

7. The client device according to claim 1, wherein the client device converts the speech to text locally within the client device.

8. The client device according to claim 2, wherein the client device converts the text to speech locally within the client device.

9. The client device according to claim 5, wherein the client device converts the text to speech locally within the client device.

10. A method for network device configuration of an access point device in a wireless network, the wireless network configured to communicatively interconnect the access point device including a network controller and one or more client devices to the Internet, the method comprising:
receiving a user voice command from the user of the client device;
converting the user voice command to a user text command;
determining whether the client device is connected to the wireless home network;
in a case of determining that the client device is not connected to the wireless home network, performing the following operations:
transmitting the user text command to an access point cloud server accessible via the Internet; and
receiving a text response message from the access point cloud server;
in a case of determining that the client device is connected to the wireless home network, performing the following operations:
transmitting the user text command to the access point device; and
receiving a text response message from the access point device;
converting the text response message to a speech response message; and
providing an audio/visual response of the speech response message to the user of the client device.

11. The method according to claim 10, wherein the transmitting of the user text command to the access point device comprises:
verifying the user text command is a valid input;
determining whether a local connection agent is present in the access point device connected to the wireless home network;
in a case of determining that the local connection agent is present in the access point device connected to the wireless home network, performing the following operations: translating the user text command onto a formatted command message; and sending the formatted command message to the access point device.

12. The client device according to claim 11, wherein the formatted command message is a JavaScript Object Notation (JSON)-based command message.

13. The client device according to claim 11, wherein the formatted command message is an Extensible Markup Language (XML)-based command message.

14. The method according to claim 10, wherein the transmitting of the user text command to the access point device comprises:
verifying the user text command is a valid input;
determining whether a local connection agent is present in the access point device connected to the wireless home network;
in a case of determining that the local connection agent is not present within the access point device connected to the wireless home network, performing the following operations: translating the user text command onto a web UI command message; and sending the web UI command message to the access point device.

15. The method according to claim 10, wherein the client device converts the speech to text and converts the text to speech locally within the client device.

16. A non-transitory computer-readable recording medium in a client device for network device configuration of an access point device in a wireless network, the wireless network configured to communicatively interconnect the access point device and one or more client devices to the Internet, the non-transitory computer-readable recording medium storing instructions which when executed by the client device cause the client device to perform operations comprising:
receiving a user voice command from the user of the client device;
converting the user voice command to a user text command;
determining whether the client device is connected to the wireless home network;
in a case of determining that the client device is not connected to the wireless home network, performing the following operations:
transmitting the user text command to an access point cloud server accessible via the Internet; and
receiving a text response message from the access point cloud server;
in a case of determining that the client device is connected to the wireless home network, performing the following operations:
transmitting the user text command to the access point device; and
receiving a text response message from the access point device;
converting the text response message to a speech response message; and
providing an audio/visual response of the speech response message to the user of the client device.

17. The non-transitory computer-readable recording medium according to claim 16, wherein the transmitting of the user text command to the access point device comprises:
verifying the user text command is a valid input;

determining whether a local connection agent is present in the access point device connected to the wireless home network;

in a case of determining that the local connection agent is present within the access point device connected to the wireless home network, performing the following operations: translating the user text command onto a formatted command message; and sending the formatted command message to the access point device.

18. The non-transitory computer-readable recording medium according to claim 17, wherein the formatted command message is a JavaScript Object Notation (JSON)-based command message.

19. The non-transitory computer-readable recording medium according to claim 17, wherein the formatted command message is an Extensible Markup Language (XML)-based command message.

20. The non-transitory computer-readable recording medium according to claim 16, wherein the transmitting of the user text command to the access point device comprises:

verifying the user text command is a valid input;

determining whether a local connection agent is present within the access point device connected to the wireless home network;

in a case of determining that the local connection agent is not present within the access point device connected to the wireless home network, performing the following operations: translating the user text command onto a web UI command message; and sending the web UI command message to the access point device.

* * * * *